United States Patent [19]

Makram-Ebeid

[11] Patent Number: 5,469,530
[45] Date of Patent: Nov. 21, 1995

[54] UNSUPERVISED TRAINING METHOD FOR A NEURAL NET AND A NEURAL NET CLASSIFIER DEVICE

[75] Inventor: Shérif Makram-Ebeid, Dampierre-en-Yvelines, France

[73] Assignee: U.S. Philips Corporation, New York, N.Y.

[21] Appl. No.: 887,636

[22] Filed: May 22, 1992

[30] Foreign Application Priority Data

May 24, 1991 [FR] France ............... 91 06278
Jul. 19, 1991 [FR] France ............... 91 09134

[51] Int. Cl.⁶ .................................. G06F 15/18
[52] U.S. Cl. ............... 395/23; 395/21; 395/24; 395/2.41
[58] Field of Search ............... 395/23, 24, 25, 395/22, 13, 27, 2.41; 364/413.01

[56] References Cited

U.S. PATENT DOCUMENTS

| | | | |
|---|---|---|---|
| 4,858,147 | 8/1989 | Conwell | 395/27 |
| 4,931,868 | 6/1990 | Kadar | 395/22 |
| 4,972,363 | 1/1990 | Nguyen et al. | 395/24 |
| 4,979,126 | 12/1990 | Pao et al. | 395/27 |
| 5,067,164 | 11/1991 | Denker et al. | 395/22 |
| 5,105,468 | 4/1992 | Guyon et al. | 395/22 |
| 5,136,686 | 8/1992 | Koza | 395/13 |
| 5,140,530 | 8/1992 | Guha et al. | 395/23 |
| 5,142,612 | 8/1992 | Sheirik | 395/23 |
| 5,142,665 | 8/1992 | Bigus | 395/23 |
| 5,150,450 | 9/1992 | Swenson et al. | 395/23 |
| 5,159,644 | 10/1992 | Martin et al. | 395/23 |
| 5,179,596 | 1/1993 | Weingard | 395/25 |
| 5,214,746 | 5/1993 | Fogel et al. | 395/23 |
| 5,218,529 | 6/1993 | Meyer et al. | 364/413.01 |
| 5,299,284 | 3/1994 | Roy | 395/22 |

OTHER PUBLICATIONS

A. J. Owens and D. L. Filkin; "Efficient Traing . . . of Stiff Ordinary Differential Equations"; vol. 2, pp. 381–386. Dec. 31, 1989 IJCNN.
L. A. Reed & J. T. Helferty; "A Translation/Rotation . . . via Gradient Optimization"; IEEE Int. Conf. on Systems Eng. Aug. 24, 1989 pp. 161–164.
Diamantaras et al, "An unsupervised neural model for oriented principal component extraction"; ICASSP 91, p. 1049–52 vol. 2, May 14–17, 1991.
Kosko, "Structural stability of unsupervised learning in feedback neural networks"; IEEE Transactions on Automatic Control, vol. 36 Iss. 7, p. 785–92, Jul. 1991.
R. Dubes et al., "Clustering methodologies in exploratory data analysis", Advances in Computers, vol. 19, 1980, pp. 113–228.
"Discriminant Analysis and Clustering", published in Statitical Science, vol. 4 (1989), pp. 34–69.
"A Neural Unsupervised Learning Technique", A. F. Atiya, Department of Electrical Engineering, California Institute of Technology, Pasadena, Calif. during symposium for the Official Jour. of the Int'l Neural Netowrk Soc., Sep. 6–10, 1988.
"Optimal Unsupervised Learning Multicategory Dependent Hypotheses Pattern REcognition", IEEE–IT–14, No. 3, May 1968, pp. 468–470.
"Learning To Recognize Patterns Without A Teacher", IEEE–IT–13, No. 1, Jan. 1967, pp. 57–64.

Primary Examiner—Robert W. Downs
Assistant Examiner—Tariq Hafiz
Attorney, Agent, or Firm—Anne E. Barschall

[57] ABSTRACT

Unsupervised training method for a neural net and a neural net classifier device wherein test vectors are supplied to the neural net whose operational parameters are classified in a stochastic labeling procedure by mutually correlating the net's output activations for each test vector and on the basis thereof generating weighting factors that scale the probabilities when selecting a class at random. Once the test vectors are thus classified, the operational parameters of the net are modified in order to intensify the differences among the patterns of output activations for all test vectors.

6 Claims, 1 Drawing Sheet

UNSUPERVISED TRAINING METHOD FOR A NEURAL NET AND A NEURAL NET CLASSIFIER DEVICE

FIELD OF THE INVENTION

The invention relates to an unsupervised training method for a neural net as classifier and to a neural net classifier device. This invention can be used in many fields, notably in that of image segmentation.

BACKGROUND OF THE INVENTION

For several years a growing number of in-depth studies have been carried out in the field of data processing by means of neural networks. In contrast to computers which function in a sequential and synchronous manner, a neural network, as interpreted in neurobiological terms, is deemed to function more or less as the human brain, with an information storage which is no longer limited to specific localized memories, but which is distributed all through the network. The advantages of structures based on neural networks then are essentially the parallel and asynchronous processing, the learning capacity, a low sensitivity to noise, and a high resistance to breakdowns use of the distribution of the information carrying elements).

A neuron, the elementary cell of the network, in its simplest version as shown in FIG. 1, is a threshold device (therefore non-linear) which delivers an output signal Y (or activation signal, or output potential) whose amplitude depends on the result of the comparison between on the one hand a given threshold S and on the other hand a sum of signals reaching the neuron from a series of elements placed upstream, which signals in their turn are formed from input signals $x_1, x_2, \ldots, x_N$ weighted with respective coefficients $w_1, w_2, \ldots, w_N$ called synaptic coefficients. According to this arrangement, which has by now become traditional, therefore, the neuron realises a weighted sum of the action potentials which it receives (i.e. of the numerical values representing the states of the neurons which have emitted these potentials), and then is itself activated if this weighted sum exceeds a certain threshold, the neuron thus activated transmitting a response in the form of a new action potential (a non-activated neuron does not transmit anything).

Among the most common neural network types one can distinguish especially the layered networks in which the neurons are arranged in successive layers, each neuron being connected to all neurons of the next layer, while the information passes from the input layer to any subsequent layers (which layers are then called hidden layers) until it reaches the output layer. Such multilayer networks appear to be particularly suitable for the resolution of classification problems. It is in fact possible to consider an entire series of examples to be classified, in which each example, defined by a set of dam, can be qualified by a data vector in a hyperspace, the data associated with this example forming the coordinates of the said vector in this hyperspace. Taking into account a predetermined input vector $\vec{X}$, it is demonstrated then that the output activations of a multilayer network provide probability values afterwards, represented as $P(C/\vec{X})$, denoting the probability that a sample belongs to various possible classes in accordance with the input vector corresponding to each example.

To carry out a given process, however, a neural network must first learn to carry it out in the course of a so-called learning stage: during a first period in which the neural network, whose characteristics have not yet been adapted to the envisaged task, will deliver erroneous results, an error of the obtained results is determined and then the parameters of the network (thresholds and synaptic coefficients) are modified on the basis of a correction criterion so as to enable this network to adapt itself progressively to the input information which it receives. This correction step is repeated for the number of examples (or input vectors) considered necessary for a satisfactory learning process of the network.

This learning phase which precedes that of the normal operation of the network is called a supervised phase since the error is evaluated through comparisons between the results obtained and those which should have been obtained, which are known in advance in this case. The parameters of the neural network are modified depending on a discrepancy between the obtained and the desired outputs, for example by error back propagation. In the following description, however, the learning process discussed is called unsupervised since the results to be obtained are not known in advance, either because such prior knowledge is not possible or because the cost of obtaining it is too high. An unsupervised learning process, therefore, means that the assignment of each of the vectors or teaching prototypes to a class must take place without any previous knowledge of the desired output values. Numerous documents have described the principle of the unsupervised teaching base, for example, the publication "Learning to recognize patterns without a teacher", IEEE-IT-13, no. 1, January 1967, pp. 57–64, or "Optimal unsupervised learning multicategory dependent hypotheses pattern recognition", IEEE-IT-14, no. 3, May 1968, pp. 468–470.

The operational phase after learning is then a phase of generalization in which the parameters of the neural network are fixed as being judged to be correct. In the course of this phase it is possible to carry out the classification of other test vectors than those of the teaching base, whereby in fact a state of the outputs permitting its classification corresponds to each of these test vectors. In short, during such a phase, the essential thing is to subdivide a set of input vectors $\vec{X}$ into different classes $j=1, 2, 3, \ldots, K-1, K$, while which the neural network must for this purpose learn to deliver for each input vector (or test vector) an activation which for each output neuron $j$ is the estimation of the probability that this prototype belongs to a given class $j$.

In the application of image segmentation chosen here, a certain number of image elements or "pixels" serve as test examples and render it possible to derive textural or other characteristics from images observed. The network will progressively learn to classify these test examples, and will then generalize so as to classify other pixels of the image.

A known learning process, the so-called "moving centers" process which is widely used, is described, in particular in the article "Cluster methodologies in exploratory data analysis", by R. Dubes and A. K. Jain, published in "Advances in Computing", vol. 19 (1980), pp. 113–228, and "Discriminant analysis and clustering", published in "Statistical Science", vol. 4 (1989), pp. 34–69. Such a process consists in that the space of the input vectors is progressively divided into several zones in dependence on the proximity of this vector to different points around which points clouds of vectors corresponding to different classes are progressively formed.

OBJECT OF THE INVENTION

The aim of the invention is to provide a learning process based no longer on the formation of these clouds around points which are in a way the centers of gravity, but on the search for boundaries between these clouds, i.e. for zones which are devoid or practically devoid of these input vectors.

SUMMARY OF THE INVENTION

To achieve this purpose, the invention provides a method of training a neural net to classify input vectors into a number of classes on the basis of a set of respective test vectors. The method is characterized in that it comprises the following steps. The neural net is initialized by assigning random values to the operational parameters of the neural net (synaptic coefficients; thresholds). Then, a stochastic labeling step is performed. The labeling is accomplished by supplying the respective test vectors to an input of the neural net, for each respective test vector monitoring a respective pattern of output activations provided at an output of the neural net, and finally assigning the respective test vector to a respective one of the classes upon mutually correlating the output activations of the respective pattern. Upon the stochastic labeling step an intensifying step is performed by means of modifying the operational parameters of the neural net for intensifying differences between the respective patterns according to a predetermined criterion, each respective pattern representing the respective class.

The mutual correlation of the output activations associated with the respective pattern in the stochastic labeling step may comprise: for each class generating an associated weighting factor on the basis of the output activations in the particular pattern and thereupon selecting the respective class in a stochastic procedure wherein probabilities of assigning the respective test vector to the classes are weighted with the associated weighting factor.

The intensifying step may comprise at least once resupplying the set of respective test vectors to the neural net in random order for generating further output activations; and for each respective test vector modifying the operational parameters on the basis of the patterns of the further output activations in order to increase the differences between the patterns. Upon termination of the intensifying step, the respective test vector is indicated as being assigned to the respective class by means of the respective pattern having, for instance, at least a respective one of the further output activations with a respective value that is more extreme than the other further output activations of the respective pattern. The the differences between the patterns may be evaluated on the basis of comparing each of the output activations of each of the patterns to a predetermined threshold.

The method may use a pretreatment of the test vectors by a mapping of the test vectors first space (feature space) onto a bounded region in a second space prior to being supplied to the neural net for enhancing clustering behaviour of the neural net. That is, each neuron partitions the feature space into a high activity bounded region and a low activity unbounded region.

An adaptable device for classifying a plurality of input vectors into classes according to the invention comprises: a neural net having an input for receiving a respective one of the input vectors, an output for providing a respective pattern of output activations associated with the respective input vector, and a memory for storing values of operational parameters of the net; a stochastic labeling means coupled to the output for generating weighting factors for each of the classes upon mutually correlating the output activations of the respective pattern and for performing a stochastic selection of a single class on the basis of probabilities weighted by the weighting factors; and an intensifying means coupled to the memory for intensifying differences between the patterns by modifying the values of the operational parameters and for storing the modified values in the memory. The stochastic labeling means may comprise a random number generator for producing a random number that lies within a predetermined range; and selection means, connected to the random number generator, for selecting the single class on the basis of a division of the range in a series of consecutive intervals, each respective interval being proportional to the respective weighting factor, the single class being specified by a particular interval wherein the random number falls.

The paper "A Neural Unsupervised Learning Technique" presented by A. F. Atiya, Department of Electrical Engineering, California Institute of Technology, Pasadena, Calif. 91125 USA, during the first symposium organized by "The Official Journal of the International Neural Network Society" in Boston, 6–10 Sep. 1988, describes an unsupervised learning process leading, as in the case of the invention, to enhancement of the classification operation by determining spatial regions, in which the input vectors or prototypes have the lowest possible density. However, this known determination is realized through a modification process of the neural net's operational parameters (synaptic coefficients, thresholds), which differs from that of the process and device described here. In fact, in the process according to the cited document, the subdivision of the input vector space uses a binary tree: at each learning step there is a separation of a portion of the original input vector space into two classes. In each step, accordingly, only a small portion of the partition problem is addressed. This disadvantage, in conjunction with that arising from the fact that the approach is not a stochastic one, leads to a non-negligible probability that a final subdivision of the input vector space is achieved which is not an optimum.

In the case of the invention, on the other hand, the choice of classes is made in a stochastic manner with a weighted probability of being selected associated with each class. Thus the neural network can achieve its learning with the values for desired outputs resulting from this stochastic choice, refreshed after one or several learning periods until the learning process is completed.

BRIEF DESCRIPTION OF THE DRAWINGS

The characteristics of the process and of the device according to the invention will now be described in more detail in the following description and the annexed drawings given by way of non-limitative example for the case of the type of application indicated above where.

DESCRIPTION OF PREFERRED EMBODIMENT

Figure 1:
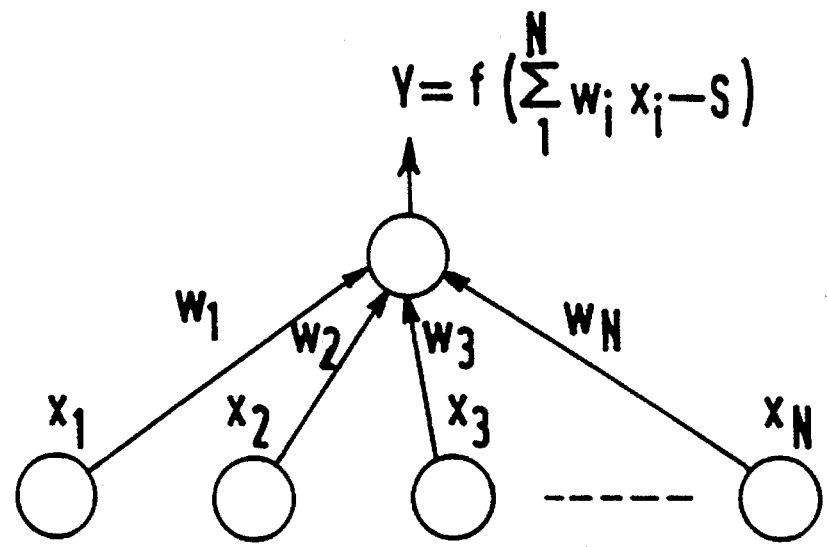
FIG. 1 is a classic representation of a typical neuron.

Image segmentation consists, as is known, in trying to extract regions of major interest from an image. In the case of images coming from satellites, for example, the regions corresponding to different types of terrain, such as urban zones, wooded regions, agricultural land, drainage networks, etc. (in general, certain known textural characteristics known for their discriminatory power in the field of classification are locally extracted before being provided to the neural network so as to reduce significantly the dimensions of the problem to be resolved and to concentrate the information on a small number of parameters). The input layer of the network then comprises a number of individual inputs corresponding exactly to the number of selected characteristics, while the number of neurons at the output of the network is equal to the number of types of texture in the image. After the learning phase, the neural network is thus capable of carrying out the classification of image zones each into one of the texture classes for which it has been trained, this class corresponding to that of the output neurons whose activity is the highest, i.e. which gives the most significant response for each of the input values.

First of all the learning process of the neurons themselves will be described, for which the user has a teaching base at his disposal. This base is formed by a set of V test vectors (or prototypes) each formed by N characteristics of an object prototype, and these V vectors of N dimensions must be classified into a number of classes lower than or equal to a maximum number of classes K fixed by the user, K obviously being lower than or equal to V. On the other hand, it is assumed in this example that a neural network having N+1 inputs and K outputs is available (so there are N+1 individual inputs of the network and K outputs).

The non-linear function inherent in each neuron is in the present example of the arctan type, and the output of any output neuron is given by the following equation (in which $Y_i$ is chosen to vary between −1 and 1) in which:

$$Y_i = \frac{2}{\pi} \arctan\left( \frac{\pi}{2} \cdot \frac{\vec{W}_i \cdot \vec{X} - S_i}{T_i} \right)$$

$\vec{X}$ is the vector representing the input pattern, $\vec{W}_i$ is the vector weight associated with the output neuron having serial number i, $S_i$ is an associated threshold, and $T_i$ is a sensitivity coefficient of the relevant neuron relative to inputs, here also referred to as "temperature" by analogy to certain thermodynamic experiments—heating treatments—during which the temperatures act as control parameters, a high temperature rendering possible the equalization of the various outputs $Y_i$, and the lowering of these temperatures on the other hand rendering possible a better recovery of the sensitivity).

Before being presented to the neural network, each of the test vectors, whose expression may be written as follows (t indicating the transposed matrix and v the serial number of the test vector concerned):

$$\vec{X}(v) = \{x_1, x_2, \ldots, x_N\}^t,$$

is hem subjected to two transformations. The first of them is the following: each of the dimensions $x_1, x_2, \ldots, x_N$ of the said test vectors is brought to a unified—or standardized—scale by means of a simple affine transformation in such a way, for example, that its average is zero and its variance equals one.

As for the second of these transformations, it was seen above that as a result of the comparison with a threshold each output neuron was capable of separating the space of the inputs into two classes, i.e. into two non-limited half-spaces separated by a separating hyperplane. The second transformation which takes place has for its object to render possible the separation of the space of test vectors into domains of limited size, by carrying out a preliminary treatment which consists of the addition of a supplementary dimension to the input space: each N-dimensional test vector $\vec{X}(v)$ is transformed into an (N+1)-dimensional vector through the addition of this supplementary dimension in the fore of a fixed component h (of a value equal to or of the order of one if the standardization has been effected as in the preceding example). These two transformations have the result that the following quantifies are henceforth supplied to (N+1) individual inputs of the neural network:

(a) to the N first inputs of the network, the N first components of the transformed test vector, which new test vector (the one which will now be offered to the neural network) being written as follows:

$$\frac{\vec{X}(v)}{\sqrt{\vec{X}(v)^2 + h^2}}$$

(b) to the (N+1)th input of the network, the (N+1)th component written as follows:

$$\frac{h}{\sqrt{\vec{X}^2 + h^2}}$$

In these expressions, the quantity:

$$\sqrt{\vec{X}^2 + h^2}$$

present in the denominator is the standard norm for the (N+1)-dimensional test vector created above (this operation is equivalent to a projection of all the points of the hyperplane of the input test vectors onto a hypersphere). Finally, the weights (or synaptic coefficients) and the thresholds of the neural network are initialized in random fashion, the norm of the synaptic vectors of each of the neurons is fixed at 1 through calculation of the current value of the synaptic vector (or "weight" vector) $\vec{W}_i$ of each output neuron and through division of this "weight" vector and the "threshold" vector of this neuron by the standard $\|\vec{W}_i\|$, and the temperatures are initialized at values close to 1. After these operations, the network is ready for the learning phase.

This phase comprises first a so-called stochastic labeling step. Providing a test vector to the neural net, an associated pattern of output activations at the net's output is the result. Note that the synaptic coefficients initially have random values. By means of mutually correlating the output activations for the pattern, a class is randomly assigned to the corresponding test vector. The respective class for each respective one of the test vectors of the teaching base is thus determined in accordance with a stochastic teacher as will be described below (i.e. through using a random process).

First of all, a class k(v) is picked at random from among the K classes, which class is associated with the test vector having the serial number v, with a probability P(k(v)=i) that one of the possible values i is attributed to k(v), for any one of the test vectors v of the said base (which has undergone the operations of achieving the dimension N+1 and fixing the standard as described above), through the use of a random number generator. Said probability is defined by the following expression:

$$P(k(V) = i) = \frac{1 + Y_i(V)}{K + \sum_{1}^{K} Y_j(V)}$$

with i and j varying from 1 to K, and $Y_i(v)$ representing the activation of the $i^{th}$ output of the neural network, where it is assumed that the output activations have values in the range (−1,1). Note that the probabilities of assignment may be determined according to another mutual correlation scheme for the output activations, depending on, e.g., the output activation range chosen.

In the learning phase, the stochastic labeling step is followed by a step to intensify the differences between the respective patterns according to a predetermined criterion, each respective pattern representing the respective class. The values of the output activations that are regarded as ideal to represent the differences may, for example, be defined as:

$Y_i(v)=Y'_i=+1$ if $k(v)=i$ $Y_i(v)=Y''_i=-1$ if $k(v)\neq i$

Note that, since the stochastic labeling step has initially classified the test vectors, it is known which class is assigned to which one of the test vectors and, therefore, which particular pattern of output activations represents which one of the classes. The intensification is obtained by modifying the neural net's operational parameters (synaptic coefficients, thresholds) by means of using a criterion based on the discrepancy between the pattern obtained and the ideal pattern defined above. The well known error backpropagation may be used, for example. Accordingly, the test vectors are provided to the neural net in random order and for each test vector the operational parameters are modified on the basis of said criterion in order to better approximate the associated ideal pattern.

For each learning iteration, i.e. for each test vector of the base which successively becomes the current test vector, the activation levels of the outputs $Y_i(v)$ of the network are then evaluated as a function of the (N+1) inputs presented to this network for i=1, 2, ..., K (K=maximum number of classes). It is decided for said current test vector having the serial number v to perform a modification of the operational parameters in the fore of one of the following two actions:

(a) either a so-called adaptation step by modification of the weights and thresholds associated with each neuron in such a manner as to make the real activation levels $Y_i(v)$ obtained come close to the ideal values $Y'_i$ or $Y''_i$ defined above, the learning rate being inversely proportional to the number of test vectors attributed to each class;

(b) or a so-called de-activation step through raising of said thresholds in such a manner as to make the activation levels $Y_i(v)$ come close to the minimum value −1 (so here we have as it were an unlearning step which works in a similar way to the learning step except for the fact that the modifications consist in raising the threshold values, thus increasing the proportion of de-activations of the output neurons). Note that raising a threshold results in reducing the region in the X-space that is mapped onto a particular output activation pattern.

These adaptation or de-activation operations take place preferably without major variations in the synaptic coefficients: for this purpose it is decided that said operations are carried out while keeping the standard norm (sum of the squares) of the said coefficients for a given output neuron substantially constant.

Said adaptation decision is taken, for instance, when the sign of $Y_i(v)$ is different for at least one of the outputs i=1 to K from that of the corresponding ideal output $Y'_i$ or $Y''_i$, or alternatively, by simple random sampling when on the other hand this sign of $Y_i(v)$ is the same as that of the said corresponding ideal output, and the decision to de-activate is taken following the said random sampling (in the example described here, the probability of the de-activation decision is a fixed value P(anti) taken in the entire interval (0–1).

After as many adaptation or de-activation steps as there are test vectors in the teaching base, the temperatures $T_i$ of the neurons are reduced, for example by multiplying them by an identical factor which is lower than and close to one, so as to prepare for a new learning period (the period during which the V test vectors of the base are offered only once is called the learning period). The learning period comprises again as many steps as there are test vectors in the base. The succession of such learning periods is terminated when a certain defined event takes place, such as, for example, when a maximum value of the number of teaming periods is exceeded or when a parameter (value of a calculated error, temperature of one of the neurons) drops below a threshold.

Obviously, the outputs $Y_i(v)$ of the neural network for the various test vectors define a new set of test vectors having the dimension K, and this set may constitute the input vectors of a new teaching base for a resumption of the learning process described above, taking into account the regrouping of initial test vectors into a number of classes L lower than K.

Figure 2:
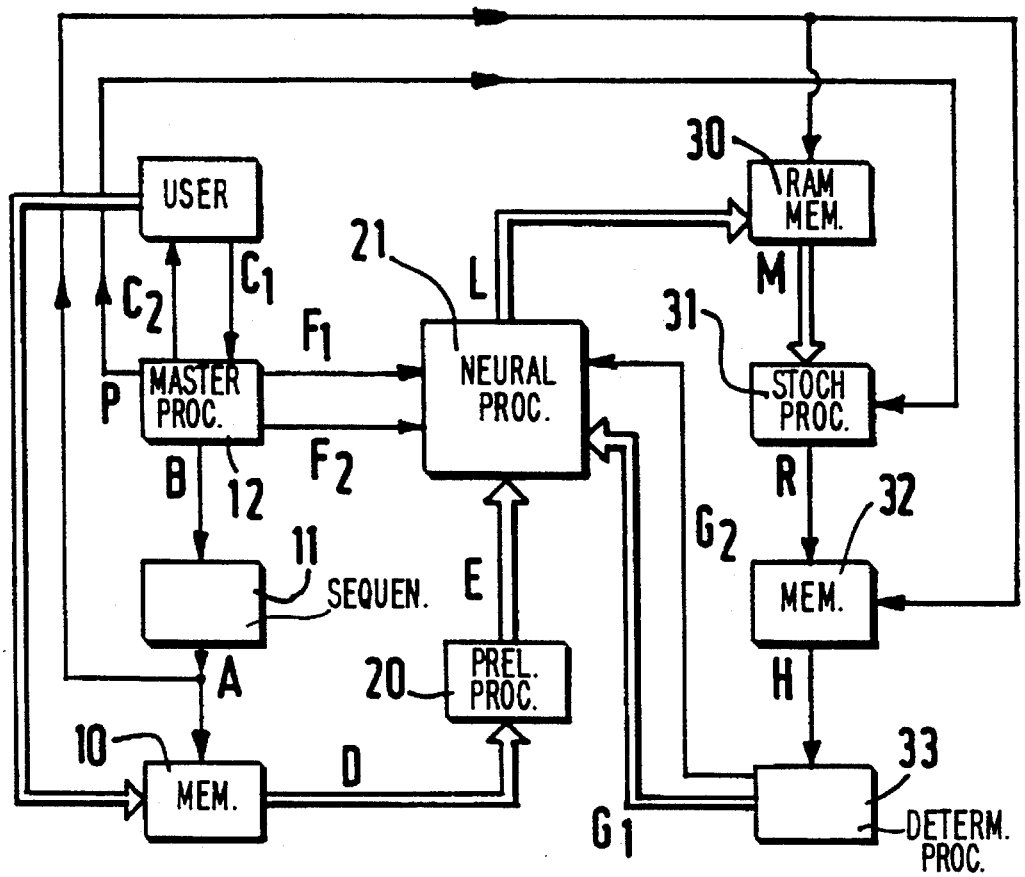
FIG. 2 shows an embodiment of a classification device according to the invention.

An example of a device for carrying out the process whose various steps have just been described in detail will now be described with reference to FIG. 2. The device shown in this FIGURE is organized around three major elements: a neural net, means for performing the stochastic labeling and means for enhancing the net's classification performance by operating on the net's operational parameters. More precisely, the device in this example comprises first of all a first memory 10 for storing test vectors of the teaching base, here a random-access memory. This memory 10 is associated with a sequencer unit 11 whose function is in particular to define (connection A) in a random manner the order in which said test vectors are presented and which in its turn is commanded (connection B) by a master processor 12 whose function is to define and monitor the way in which the process takes place. This master processor 12 is, for example, a sequential computer which receives the information for defining the teaching base from the user U (connection $C_1$): number of test vectors V, maximum number of classes K, dimension N of the input vectors, and also the test vectors for which the master processor 12 controls (connection $C_2$) the input into the first memory 10.

Before being offered to the neural network, the test vectors receive a supplementary dimension in a preliminary processor 20, as we have seen, which receives these vectors through connection D. The neural network is arranged in a neural processor 21 which receives the output signal from the preliminary processor 20 (connection E), i.e. the (N+1)-dimensional test vectors. This neural processor 21 also receives (connection $F_1$) from the master processor 12 a decision signal regarding the operating mode, which mode is the execution of either the classification phase proper, during which the evaluation of the K output signals of the neural network of the said neural processor 21 for the (N+1) input data is carried out, or the learning phase during which the operations necessary for making the output values obtained come close to the desired output values are carried out. These desired output values are sent to the neural processor 21 through connection $G_1$ and are defined by means of a determination processor 33 which also supplies the decision to adapt or the decision to de-activate (connection $G_2$). Processor 33 receives the desired class for each test vector from a memory 32 storing the classes assigned to the test vectors (connection H).

A third random-access memory 30 is provided at the output of the neural processor 21 (connection L) for storing the K output activations corresponding to each input test vector, i.e. for storing output vectors having the dimension K. The K activations thus obtained are provided to a stochastic processor 31 (connection M) which initially determines from them the class of each test vector by random sampling in accordance with the procedure described above. The memory 30 of the output activations and the memory 32 of the test vector classes receive the indication of the order of presentation of the test vectors to the neural network of the neural processor 21, as does the memory 10, through the same connection A.

The operation of the device thus formed is the following. The user U provides (connection $C_1$) the various pieces of information described above, upon which the master processor 12 initializes (connection $F_2$) the temperatures of the neurons, here to a high value close to 1, and then sends a command signal (connection B) to the sequencer unit 11 so that the latter can define a sequence for all the test vectors present in the teaching base. The master processor 12 in addition imposes the operating mode "classification phase" on the neural processor 21 (connection $F_1$). For each of the V test vectors of the teaching base presented sequentially (after pretreatment in the processor 20) to the neural processor 21, the corresponding vector of the K output activations is evaluated by this processor 21 and subsequently stored in the third memory 30.

After these output activations have thus been evaluated and stored as output vectors, the stochastic processor 31 receives from the master processor 12 (connection P) a command signal causing it to carry out the determination of the classes of the V test vectors through the process of random sampling. The classes thus defined are stored (connection R) in the second memory 32.

The master processor 12 then sends (through connection B) a command signal for executing a learning period (as will be remembered here, at a given temperature of the neurons) for all the test vectors of the base and in the order previously defined for these vectors by the sequencer unit 11, and imposes on the neural processor 21 (connection $F_1$) the operating mode "learning". This period comprises for each test vector v the following steps as described above: presenting said vector to the input of the neural processor 21, associating the vector with the class previously determined and thereupon modifying the operational parameters of the net depending on the obtained output activation pattern.

The same functional process, i.e. the totality of the steps described above after that of initializing the temperatures of the neurons to a value close to 1, is then repeated several times while the temperatures of the neurons are progressively reduced (connection $F_2$), and this continues until this process is interrupted either because the number of repeat operations (learning periods at a given temperature) exceeds a previously fixed limit, or because the temperature of the neurons passes below a predetermined limit value.

I claim:

1. A device for classifying in unsupervised training a plurality of input vectors into classes comprising:

(a) neural net having an input for receiving the input vectors and an output for providing a pattern of output activations associated with the input vector, and a memory for storing values of operational parameters of the net;

(b) a stochastic labeling means, coupled to the output, for generating weighting factors for each of the classes upon mutually correlating the output activations of the patterns and for perfoming a stochastic selection using probabilities of a single class on the basis of probabilities weighted by the weighting factors;

(c) an intensifying means coupled to the memory for intensifying differences between the patterns by modifying the values of the operational parameters upon re-supplying the test vectors in random order and for storing the modified values in the memory.

2. The device of claim 1 wherein the stochastic labeling means comprises a random number generator for producing a random number that lies within a predetermined range;

selection means, connected to the random number generator, for selecting the single class on the basis of a division of the range in a series of consecutive intervals, each interval being proportional to a weighting factor, the single class being specified by a particular interval wherein the random number falls.

3. An unsupervised training method for training a neural net having plural inputs to classify input vectors into a number of classes on the basis of a set of test vectors comprising the steps:

(a) initializing the neural net by assigning random values to operational parameters of the neural net, (b) performing a stochastic labelling of classes by:
        (i) supplying a set of test vectors to the inputs of the neural net,
        (ii) for each test vector, obtaining a pattern of output activations at an output of the neural net,
        (iii) assigning the test vectors to the classes, by mutually correlating the patterns of output activations by generating an associated weighting factor on the basis of said activations and selecting the class in a stochastic procedure having probabilities wherein the probabilities of assigning the test vectors to the classes are weighted with the associated weighting factors, (c) said stochastic labelling step including an intensifying step, said intensifying step including:
        (i) at least once:
            (1) re-supplying the set of test vectors to the neural net in random order for generating further output activations;
            (2) for each test vector modifying the operational parameters on the basis of the patterns of the further activations in order to increase the differences between the patterns.

4. The method of claim 3 wherein, upon termination of the intensifying step, each test vector is indicated as being assigned to a class by means of a respective pattern having at least one of the further output activations with a value that is more extreme than the other further output activations of the pattern.

5. The method of claim 3 wherein the test vectors of a first space are pretreated by means of subjecting the test vectors to a mapping onto a bounded region in a second space prior to being supplied to the neural net for enhancing clustering behaviour of the neural net.

6. An unsupervised training method for training a neural net to classify data, comprising the steps:
   (a) initializing the neural net by assigning random values to operational parameters of the neural net,
   (b) performing a stochastic labelling of classes by:
      (i) supplying a set of test vectors to an input of the neural net,
      (ii) for each test vector, obtaining a pattern of output activations at an output of the neural net,
      (iii) assigning the test vectors to the classes, by mutually correlating the patterns of output activations,
   (c) said stochastic labelling step including an intensifying step, said intensifying step including:
      (i) modifying the operational parameters of the neural net, in response to a second pass through the test vectors, for intensifying differences between the patterns of output activations according to a predetermined criterion, so that each pattern represents a better-defined class,
      (ii) said second pass including, at least once:
         (1) re-supplying the set of test vectors to the neural net in random order for generating further output activations,
         (2) for each test vector modifying the operational parameters on the basis of the patterns of the further activations in order to increase the differences between the patterns,
      (iii) upon termination of the intensifying step, each test vector being indicated as being assigned to a class by the use of a pattern having at least one of the further output activations with a value that is more extreme than the other further output activations of the pattern,
   (d) the differences between the patterns being evaluated on the basis of comparing each of the further output activations of each of the patterns to a predetermined threshold.

* * * * *